(12) United States Patent
Fox

(10) Patent No.: US 9,977,896 B2
(45) Date of Patent: May 22, 2018

(54) SYSTEMS AND METHODS FOR GENERATING POLICIES FOR AN APPLICATION USING A VIRTUALIZED ENVIRONMENT

(71) Applicant: Digital Guardian, Inc., Waltham, MA (US)

(72) Inventor: John C. Fox, Needham, MA (US)

(73) Assignee: DIGITAL GUARDIAN, INC., Waltham, MA (US)

( * ) Notice: Subject to any disclaimer, the term of this patent is extended or adjusted under 35 U.S.C. 154(b) by 71 days.

(21) Appl. No.: 14/878,415

(22) Filed: Oct. 8, 2015

(65) Prior Publication Data

US 2017/0103201 A1 Apr. 13, 2017

(51) Int. Cl.
*G06F 21/00* (2013.01)
*G06F 21/53* (2013.01)
*G06F 21/56* (2013.01)
*H04L 29/06* (2006.01)

(52) U.S. Cl.
CPC ............ *G06F 21/53* (2013.01); *G06F 21/566* (2013.01); *H04L 63/20* (2013.01); *G06F 2221/033* (2013.01); *H04L 63/1433* (2013.01)

(58) Field of Classification Search
None
See application file for complete search history.

(56) References Cited

U.S. PATENT DOCUMENTS

| | | | |
|---|---|---|---|
| 8,850,579 B1 * | 9/2014 | Kalinichenko | G06F 21/53 726/22 |
| 9,413,778 B1 * | 8/2016 | Elisha | H04L 63/1425 |
| 9,418,222 B1 * | 8/2016 | Rivera | G06F 21/554 |
| 2008/0016339 A1 * | 1/2008 | Shukla | G06F 21/53 713/164 |
| 2008/0072324 A1 * | 3/2008 | Repasi | G06F 21/566 726/23 |

(Continued)

FOREIGN PATENT DOCUMENTS

WO WO-2013/067505 5/2013

OTHER PUBLICATIONS

International Search Report and Written Opinion for PCT/US2016/055188 dated Dec. 1, 2016.

*Primary Examiner* — Madhuri Herzog
(74) *Attorney, Agent, or Firm* — Paul M. H. Pua; Foley & Lardner LLP

(57) ABSTRACT

Provided herein are systems and methods for generating policies for a new application using a virtualized environment. Prior to allowing a new application to operate on a host system, the new application may be installed in a virtual environment. A first program execution restrictor of the virtualized environment may determine a set of policies for the new application. The set of policies may allow the new application to add specific program elements during installation and execution in the virtualized environment. The first program execution restrictor may verify an absence of malicious behavior from the new application while the new application executes in the virtualized environment. The new application may be executed on the host system responsive to the verification. The host system may have a second program execution restrictor that applies the set of policies when the new application is allowed to execute on the host system.

20 Claims, 7 Drawing Sheets

(56) References Cited

U.S. PATENT DOCUMENTS

| 2011/0145926 | A1  | 6/2011 | Dalcher et al. |            |
|--------------|-----|--------|----------------|------------|
| 2013/0086684 | A1* | 4/2013 | Mohler         | G06F 21/53 |
|              |     |        |                | 726/24     |
| 2013/0145463 | A1* | 6/2013 | Ghosh          | G06F 21/56 |
|              |     |        |                | 726/22     |
| 2015/0007315 | A1* | 1/2015 | Rivera         | G06F 21/51 |
|              |     |        |                | 726/23     |

* cited by examiner

SYSTEMS AND METHODS FOR GENERATING POLICIES FOR AN APPLICATION USING A VIRTUALIZED ENVIRONMENT

FIELD OF THE DISCLOSURE

This disclosure generally relates to systems and methods for securing a computing environment, including but not limited to systems and methods for configuring policies for a new application within a software restriction environment.

BACKGROUND OF THE DISCLOSURE

Certain software applications, such as blacklisting applications, whitelisting applications, change management applications, and intrusion prevention applications, et cetera, may restrict the ability to save to a file system, to edit or delete a file, or to install and execute programs (e.g., executables) or program elements (e.g., dynamic link libraries) based on configurable criteria. Currently, specifying which files, programs, and program elements may be allowed by these software applications is largely done by manual input.

BRIEF SUMMARY OF THE DISCLOSURE

Described herein are systems and methods for generating policies for a new application using a virtualized environment prior to executing on a host operating system of a client device. For example, embodiments of the present systems and methods can allow applications to be executed on the host operating system according to the program execution restriction policies, after being verified and tested in virtualized environment. Illustrative applications for the present systems and methods may include, but not limited to using a program execution restrictor in a virtualized environment to generate policies for an application and/or verify that the application would not cause any security vulnerabilities to the computing system once executed on a host operating system of the computing system. A program execution restrictor may comprise any program or other computing system component configured to specify which applications to allow to be added, edited, deleted and/or executed. Certain files, programs, and program elements that may be required for a computing system's operation for example, may each be identified as allowable or disallowed by a program execution restrictor based on a set of rules or policies. Certain aspects of this disclosure are directed toward an application virtualized sandbox to detect any possible malicious behavior of a newly installed or downloaded application. By running a newly installed or not yet authorized application in an application virtualization sandbox, any malicious behavior from the application may be confined to the virtualized environment.

In some embodiments, a system may utilize a program execution restrictor that can be installed in one or more systems or environments, for example a program execution restrictor on the host system and a program execution restrictor in the virtualized environment. Using these instances or installations of the program execution restrictor, any newly installed or not yet authorized application may not be executed until the program execution restrictor has been configured with an appropriate set of policies to allow normal execution of the application while protecting the host system, e.g., policies configured not to restrict programs and program elements constituting the application. In addition, the set of policies created using and/or for the program execution restrictors may be configured to restrict and/or allow the adding of certain new programs and program elements to the computing system during the installation of the application. The program execution restrictor of the virtualized environment may generate the set of policies in an operational mode, during which the program execution restrictor does not apply restrictions specified by the set of policies, by recording a log of every operation that would have been restricted by the set of policies. The program execution restrictor of the virtualized environment may generate a policy or rule for each operation recorded in the log. For example, a generated policy may specify to the program execution restrictor not to restrict a particular operation recorded in the log when detected again in the future.

Since the behavior of an application may not be known before run-time, a program execution restrictor may need to accumulate run-time data by observing the application during run-time to determine whether the application or its program element is malicious. By confining operations of the application within a virtualized environment, any potentially malicious operation may be confined therein. In addition, containing operations of the application within the virtualized environment may allow for the generation of the set of policies to permit the application to run under the protection of the program execution restrictor of the host operating system and testing the application to determine whether the application contains or initiates any malicious operations, prior to deciding whether to put the set of policies in place for use by the program execution restrictor of the host system. Once the application has been tested in the virtualized environment and the set of policies generated by the program execution restrictor of the virtualized environment for the application, the program execution restrictor of the host system may then apply the generated set of policies when executing the application on the host operating system.

In some aspects, the present disclosure is directed to a method of generating policies for a new application using a virtualized environment prior to executing on a host operating system of a client device. Prior to allowing a new application to operate on a host system, the new application may be installed in a virtual environment for execution. A first program execution restrictor of the virtualized environment may determine a set of policies for the new application. The set of policies may allow the new application to add specific program elements during installation and execution of the new application in the virtualized environment. The first program execution restrictor applying the set of policies may verify an absence of malicious behavior from the new application while the new application executes in the virtualized environment. The new application on the host system may be executed, responsive to the verification. The host system may have a second program execution restrictor that applies the set of policies when the new application is allowed to execute on the host system.

In some aspects, the present disclosure pertains to a system for generating policies for a new application using a virtualized environment prior to executing on a host operating system of a client device. A virtualized environment may be configured for installing a new application for execution, prior to allowing the new application to operate on a host system. A first program execution restrictor may execute in the virtualized environment, the first program execution restrictor configured for determining a set of policies for the new application. The set of policies may allow the new application to add specific program elements during installation and execution of the new application in the virtualized environment. The first program execution restrictor may be configured for verifying, via the set of policies, an absence of malicious behavior from the new application while the new application executes in the virtualized environment. The new application may be allowed to execute on the host system responsive to the verification. A second program execution restrictor, executing on the host system, may be configured to apply the set of policies when the new application executes on the host system.

The program execution restrictors described above may be applicable to Internet-based applications. Web browsers may enable the execution of applications that are available from servers via the Internet based on standard protocols. The standard protocols for these web applications may allow the web browsers to locally download such applications onto the computing system and execute them as programs or program elements. The program execution restrictor may block the installation and/or execution of downloaded programs or program elements. By allowing any downloaded web application to be executed in a trusted mode of the Web browser, the program execution restrictor may allow the web application to run while ensuring that access to any other web applications that are not trusted is not permitted.

In some embodiments, the web browser may include a browser extension to filter request queries based on associated URL addresses, and to interface with a program execution restrictor. When the web browser sends a request query for a web application, the browser extension may intercept the request query, and a URL address filter of the browser extension may determine whether a URL address corresponding to the request query is on a list of trusted URL addresses. A single web application may include many web pages, each referencing a different, distinct URL address. In some cases, the URL addresses of the web application may share some common base element of the URL (e.g., hostname), which may be identified by the URL filter. The URL filter may in addition determine whether a web pages visited by the web browser is part of the web application and determine whether the web page visited is on the list of trusted URL addresses.

If the URL filter determines that the URL address is on the list of trusted URL addresses, the browser extension may then signal the program execution restrictor to allow downloading and installation of the web application. The browser extension may also signal the program execution restrictor to run the web application in a new instance of the web browser (e.g., a separate browser window) and specify that the program execution restrictor allow programs and program elements downloaded as part of the web application to run based on rules and policies for the web application. The program execution restrictor may also disallow the computing device from running any other web application besides the verified web application to run on the new instance of the web browser.

In some aspects, the present disclosure pertains to a method of applying policies for a new web application using a browser extension. Prior to allowing a new web application to execute on a web browser, a browser extension may receive a query. A filter may determine that a URL address of the query is on a list of trusted URL addresses. A web program execution restrictor of the browser extension may apply a set of policies, while the new application at least one of installs or executes via the web browser.

In some aspects, the present disclosure pertains to a system for applying policies for a new web application using a browser extension. Prior to allowing a new web application to operate on a web browser, a browser extension may receive a query. A filter may determine that a URL address of the query is on a list of trusted URL addresses. A web program execution restrictor of the browser extension may apply a set of policies, while the new application at least one of installs or executes via the web browser.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
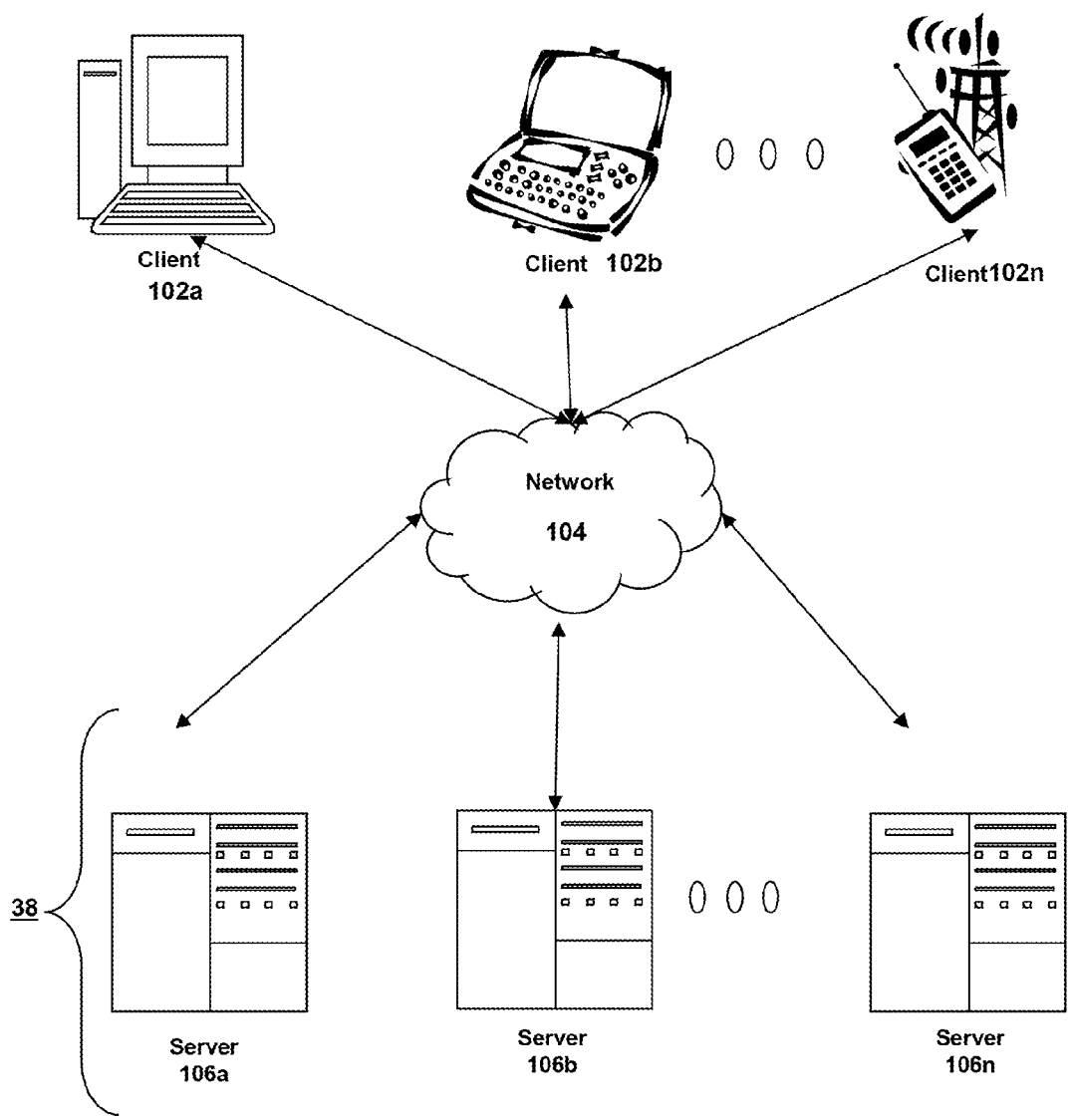
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for generating policies for a new application using a virtualized environment prior to executing on a host operating system; and Section C describes embodiments of systems and methods for applying policies to a new web application using a browser extension.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106a-106n (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101a-101n.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual memories that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server 106a receives requests from the client 101, forwards the requests to a second server 106b and responds to the request by the client 101 with a response to the request from the server 106b. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106.

Figure 1B:
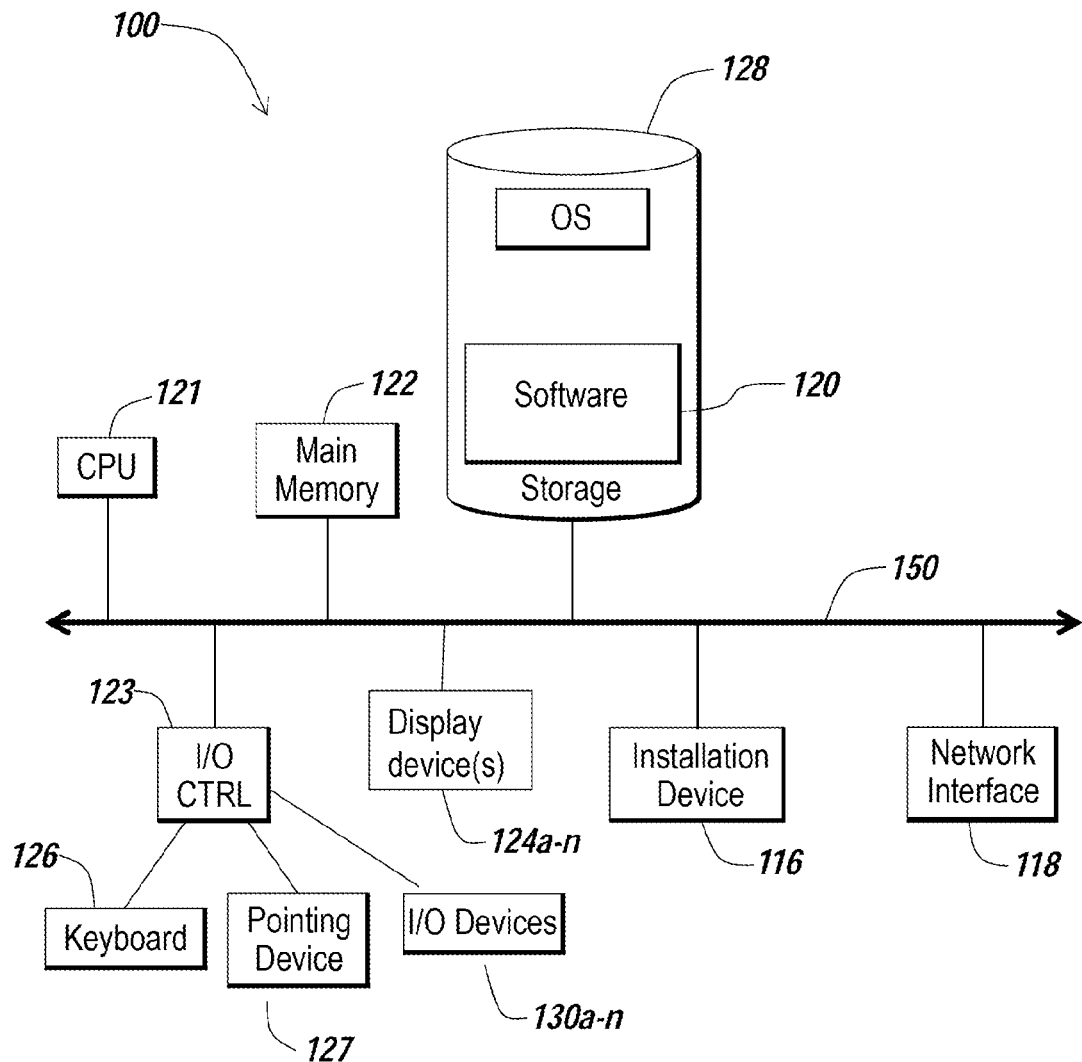
FIGS. 1B and 1C are block diagrams depicting embodiments of computing devices useful in connection with the methods and systems described herein.
Figure 1C:
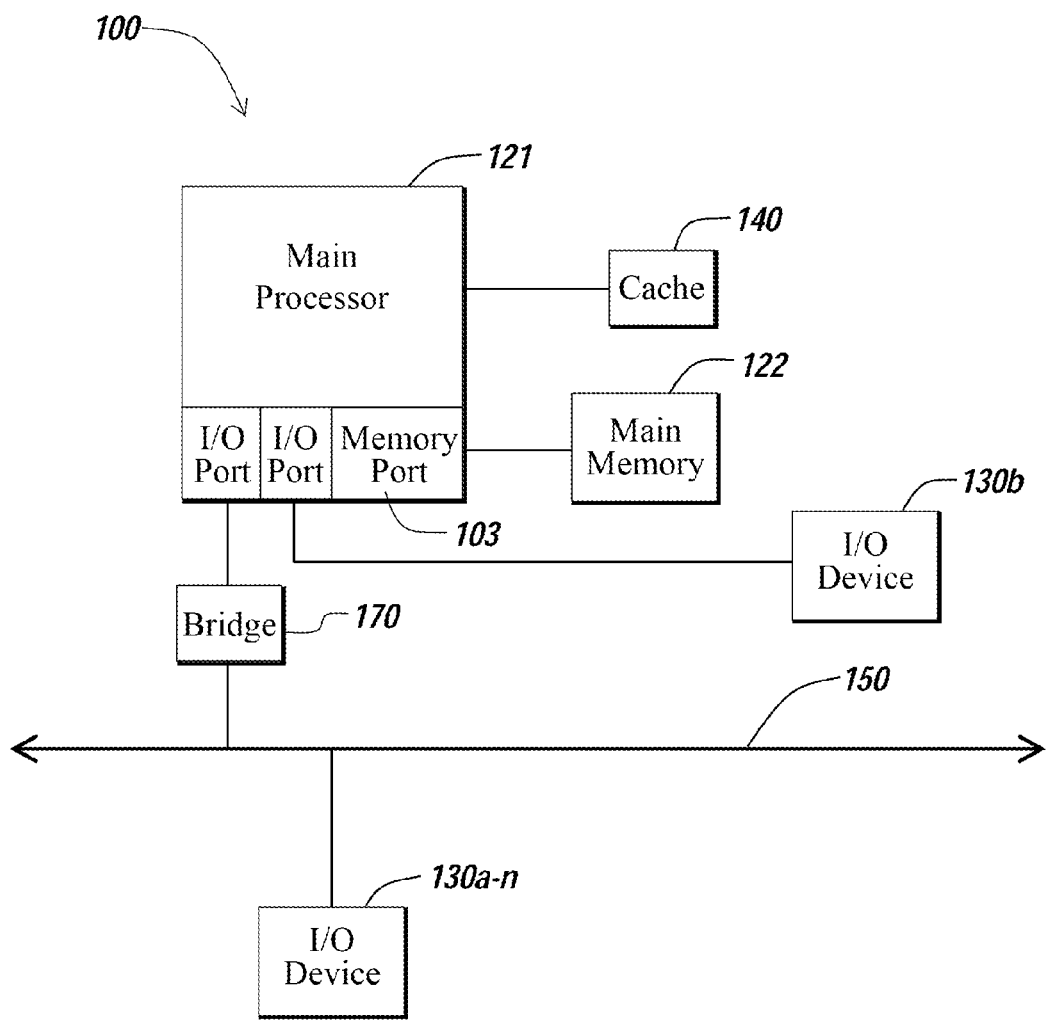

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-101n, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130b, for example via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 players. In yet other embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

In some embodiments, the status of one or more machines 101, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Generating Policies for a New Application Using a Virtualized Environment Prior to Executing on a Host Operating System Program execution restrictors may be configured to specify which applications to allow to be added, edited, deleted, or executed. All files, programs, and program elements that may be required for normal operations of a computing system, for example, may each be identified as allowable or disallowed by the program execution restrictor based on a set of rules or policies.

Described herein are systems and methods for generating policies for a new application using a virtualized environment prior to executing on a host system. For example, embodiments of the present systems and methods can allow applications to be executed on the host system according to the program execution restriction policies, after being verified and tested in a virtualized environment. Illustrative applications for the present systems and methods may include, but is not limited to using a program execution restrictor in a virtualized environment to generate policies for an application, and/or verify that the application would not cause any security vulnerabilities to the computing system once executed on a host system. Certain aspects of this disclosure are directed to the use of an application virtualized sandbox to detect any possible malicious behavior of a newly installed or downloaded application. By running a newly installed or not yet authorized application in an application virtualization sandbox, any malicious behavior from the application may be confined to the virtualized environment.

In some embodiments, a system may utilize two program execution restrictors: a program execution restrictor of the host system and a program execution restrictor of the virtualized environment. For example, using two program execution restrictors (or two instances of a program execution restrictor), any newly installed or not yet authorized application may not be executed until the program execution restrictor on the host system has been configured with an appropriate set of policies to allow normal execution of the application while protecting the host system, e.g., policies configured not to restrict programs and program elements constituting the application and/or used by the application. In addition, the set of policies created by the program execution restrictors may be configured to restrict and/or allow the adding of certain new programs and program elements to the computing system during the installation of the application. The program execution restrictor of the virtualized environment may generate the set of policies in an operational mode, during which the program execution restrictor does not apply restrictions specified by the set of policies, by recording a log of every operation that would have been restricted by the set of policies. The program execution restrictor of the virtualized environment may generate a policy or rule for each operation recorded in the log. For example, a generated policy may specify to the program execution restrictor not to restrict a particular operation recorded in the log when detected again in the future.

Since the behavior of an application may not be known before run-time, a program execution restrictor may need to accumulate run-time data by observing the application during run-time to determine whether the application or its program element is malicious. By confining operations of the application within a virtualized environment, any potentially malicious operation may be confined therein. In addition, containing operations of the application within the virtualized environment may allow for the generation of the set of policies to permit the application to run under the protection of the program execution restrictor of the host system, and testing the application to determine whether the application contains or initiates any malicious operations, prior to deciding whether to put the set of policies in place for use by the program execution restrictor on the host system. Once the application has been tested in the virtualized environment and the set of policies generated by the program execution restrictor of the virtualized environment for the application, the program execution restrictor of the host system may then apply the generated set of policies when executing the application on the host system.

Figure 2A:
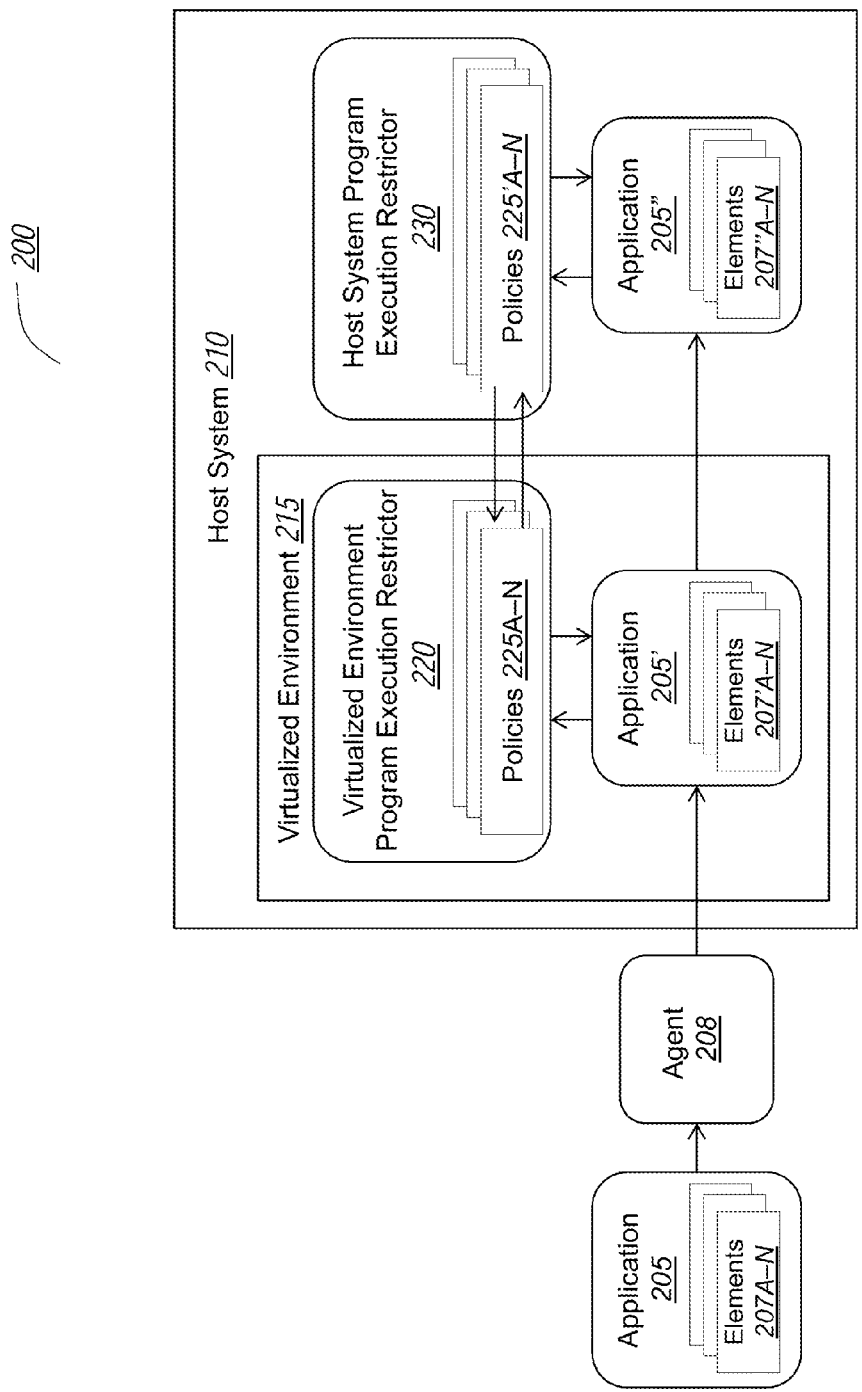
FIG. 2A is a block diagram depicting embodiments of a system for generating policies for a new application using a virtualized environment prior to executing on a host operating system.

Referring to FIG. 2A, an embodiment of system 200 for generating policies for a new application using a virtualized environment prior to executing on a host operating system is depicted. In brief overview, the system 200 may include a new application 205, an agent 208, a host system 210, a virtualized environment 215, a virtualized environment program execution restrictor 220, and a host system program execution restrictor 230. The application 205 may include and/or use one or more elements 207A-N, and may be installed from outside host system 210 onto the host system 210 (e.g., new program 205' and verified program 205"). The virtualized environment program execution restrictor 220 and the host system program execution restrictor 230 may each include a set of policies 225A-N and 225'A-N.

Each of these components of system 200 may be controlled by, implemented using, or incorporate features of a computing device, for example as described above in connection with FIGS. 1A-1C. Each component, module, and any sub-module thereof, includes hardware or a combination of hardware and software. For example, a module or sub-module may include any application, program, library, script, task, service, process or any type and form of executable instructions executing on any type and form of hardware of the system. In some embodiments, a module or submodule may incorporate one or more processors and/or circuitries configured to perform any of the operations and functions described herein. For example, system 200 and the any of the components therein may run or be executed on one or more processors and memory of a computing system, such as the main processor 121 and main memory 122 of computing device 100.

The new application 205 may comprise any type or form of software application, script, process, etc. The new application 205 may include and/or use one or more elements 207A-N. The one or more elements 207A-N of the application 205 may include one or more executables (e.g., EXE, CMD, BAT) and/or one or more dynamic link libraries (e.g., DLLs). In some embodiments, the one or more elements 207A-N includes one or more programs (e.g., executables) and/or one or more program elements (e.g., DLLs). The one or more programs and/or program elements are sometimes generally referred to as one or more program elements, which may include executables and/or DLLs (without distinguishing between "programs" and "program elements" for example). The one or more elements 207A-N may specify processes, sub-processes, modules, operations, or actions for the host system 210 (e.g., computing device 100) to execute.

Some or all of the one or more elements 207A-N may exhibit malicious behavior, while the remaining one or more elements 207A-N may exhibit non-malicious behavior. In some embodiments, a malicious element 207A-N may be configured to access resources not permitted to be read or modified by the application 205 or the one or more elements 207A-N. For example, a malicious element 207A-N of the application 205 may be configured to attempt to access memory addresses of the main memory of the host system 210 (e.g., main memory 122 of computing device 100) that are not allocated to the application 205. In another example, a malicious element 207A-N of the application 205 may be configured to attempt to access or modify data stored on the host system 210 that the application 205 does not have permission to access. In some embodiments, a malicious element 207A-N may be configured to transmit data not permitted to be accessed or provided by the application 205 and/or the one or more elements 207A-N. For example, a malicious element 207A-N may be configured to attempt to log activity from the input and output devices of the host system 210 (e.g., keyboard 126 of the computing device 100) and transmit the activity to a third-party server (e.g., server 106A-N).

In some embodiments, the new application 205 may be initially an executable or a dynamic link library to be installed on the host system 210 (e.g., storage 128 of the computing device 100). For example, the application 205 may be stored on and/or accessible from an external storage, such as on a CD, DVD, thumb drive, flash memory drive, external hard drive, and hard drives on an external server (e.g., server 106A-N), and may be introduced onto the host system 210 as application 205' or 205" upon installation or download. In some embodiments, the application 205 may initially have been stored on the host system 210 but not yet authorized to be executed by the program execution restrictors 220 and 230. For example, a file corresponding to the application 205 may have been downloaded onto the storage 128 of the computing device 100 from a server 106A-N, but not have been installed or executed.

The agent 208 may be configured to intercept a request to install the new application 205 on the host system 210. The agent 208 may sometimes be referred to as an enforcer agent or enforcer. In some embodiments, as depicted in FIG. 2, the agent 208 may reside outside the host system 210 and intercept the request to install the new application 205 from outside the host system 210. For example, the agent 208 may reside in an external server 106A-N, or one or more external servers 106A-N (e.g., cloud), or an intermediary appliance in network 104. In this example, the agent 208 residing in an external server 106A-N may be configured to receive or intercept a request to download an application 205 from the host system 210. In some embodiments, the agent 208 may reside and execute on the host system 210 and intercept or receive the request to install the new application 205 on the host system 210. For example, suppose the installation file corresponding to the application 205 resides on the host system 210. In this example, when a user of the host system 210 requests to execute the installation file, the agent 208 may be configured to intercept the request to execute the installation file.

The agent 208 may be configured to direct the new application 205 to the virtualized environment 215 for installation, responsive to the request to install the new application 205 on the host system 210. In some embodiments, the agent 208 may be configured to request, instruct or otherwise signal the virtualized environment 215 to execute the new application 205' for verifying the presence and/or absence of malicious behavior in the new application 205', by the new application 205', or arising from the new application 205'. Malicious behavior can refer to a variety of forms of hostile or intrusive behavior. Malicious behavior can arise from program elements that include or introduces to an environment computer viruses, worms, trojan horses, ransomware, spyware, adware, scare are, and other malicious programs. It can take the form of executable code, scripts, active content, and other software, Embodiments of the present systems and methods can be used to protect data from exfiltration, movement, and/or damage by malicious programs (sometimes referred to as malware) which is injected into an application or otherwise using the application to access the data, whether the application is legitimate or includes malware.

In some embodiments, the agent 208 may install the new application 205 on the host system 210 (e.g., storage 128 of computing device 100) and then signal the virtualized environment 215 to execute the new application 205' to verify the absence of malicious behavior. In some embodiments, the agent 208 may be configured to signal the virtualized environment 215 to execute the new application 205 to verify the absence of malicious behavior, responsive to the request to install the new application 205. For example, if the agent 208 and the virtualized environment 215 reside and are executed on an external server 106A-N outside the host system 210, the agent 208 may be configured to install the new application 205 on the external server 106A-N (or one or more other devices) and signal the virtualized environment 215 to execute the new program 205' to verify the absence of malicious behavior.

The agent 208 may be configured to request the virtualized environment 215 to transition the application 205' to the host system 210 after verifying the absence of malicious behavior. In some embodiments, after the virtualized environment 215 verifies the absence of malicious behavior in the application 205', the agent 208 may be configured to receive an indicator indicating the verification of the absence (and/or presence) of malicious behavior from the virtualized environment 215. In some embodiments, the agent 208 may be configured to request the virtualized environment 215 to transition the application 205' to the host system 210, responsive to receiving the indicator indicating the absence of malicious behavior from the application 205'. In some embodiments, the agent 208 may be configured to signal the host system 210 that the application 205' may be executed by the host system 210 after verifying the absence of malicious behavior when operating in the virtualized environment 215. For example, after receiving the indicator indicating the absence of malicious behavior in the application 205', the agent 208 may be configured to signal the host system 210 to permit execution of the new, now verified application 205".

In some embodiments, the agent 208 may be configured to set privileges for one or more host systems 210 (e.g., client devices 102A-N). The privileges may specify whether the host system 210 may install the new application 205. In some embodiments, the agent 208 may be configured to disallow installation of the new application 205 based on the privileges, responsive to intercepting the request to install. In some embodiments, the agent 208 may be configured to update the application 205. For example, the agent 208 may be configured to provision and/or patch the application 205 with software updates, such as by adding or editing the one or more elements 207A-N. In some embodiments, the agent 208 may be configured to generate reports of privileges for each of the one or more host systems 210. In some embodiments, the agent 208 may be configured to generate reports of indicator indicating the verification of the absence of malicious behavior from the application 205'.

In some embodiments, the agent 208 may be configured to generate and/or associate a unique key with an verified application 205", for example responsive to receiving the indicator indicating the verification of the absence of malicious behavior from the application 205'. The unique key may be, for example, a hash code or an array index, among others to identify the verified application 205". In some embodiments, the agent 208 may be configured to determine whether the new application 205' is associated with the unique key. In some embodiments, the agent 208 may be configured to allow the host system 210 (e.g., client device 102A-N) to install the new application 205, responsive to determining that the application 205' is associated with the unique key. In some embodiments, the agent 208 may be configured to disallow the host system 210 from installing the new application 205. For example, if there is not a matching unique key or the application 205 is unknown, the agent 208 may deny access to the file corresponding to the application 205. In some embodiments, the agent 208 may be configured to store the unique key on the host system 210. In some embodiments, the agent 208 may be configured to store the unique key on a storage device, location and/or data structure associated with the agent 208.

The host system 210 may be a networked computing device (e.g., computing device 100) that may provide applications to users of the networking computing device or other networked computing devices. In some embodiments, the host system 210 may be the host operating system of a client device (e.g., computing device 100). In some embodiments, the host system 210 may be the client device or a virtual machine or virtual machine desktop. In some embodiments, the host system 210 may include a virtualized environment 215 that may include a virtualized environment program execution restrictor 220 to generate a set of policies 225A-N and/or to verify the absence of malicious behavior in application 205'. In some embodiments, the host system 210 may include a host system program execution restrictor 230 to apply policies 225'A-N on the verified application 205". In some embodiments, the host system 210 may include the agent 208. Any of the components of the host system 210 may run or be executed on one or more processors and memory of a computing system, such as the main processor 121 and main memory 122 of computing device 100 as depicted in FIG. 1.

The virtualized environment 215 may include a program execution restrictor 220 that may include a set of policies 225A-N, a process monitor, and/or a policy generator. The virtualized environment program execution restrictor 220, process monitor, and/or policy generator may be operated, run, or otherwise executed in the virtualized environment 215. In some embodiments, the virtualized environment 215 may reside on the host system 210, as depicted in FIG. 2. In some embodiments, the virtualized environment 215 may reside outside the host system 210 on one or more devices, for example, on an external server 106A-N, a plurality of external servers 106A-N (e.g., cloud), or an intermediary appliance between the external server 106A-N and the host system 210 in the network 104. In some embodiments, memory addresses and storage space may be allocated to the virtualized environment 215 for use in verifying the new application 205, separate from other normal processes of the respective computing systems.

The virtualized environment 215 may be configured to execute the new application 205' without affecting the host system 210. For example, the virtualized environment 215 may be a virtual machine, a partition of a computing device 100, a computing device 100 itself, an environment that may mimic or is a clone of a host system 210, and an environment that may be quarantined (e.g., from other network resources and/or host system resources) and/or self-contained. In these examples, if the new program 205' exhibits malicious behavior, executing the new program 205' in the virtualized environment 215 may prevent the malicious behavior from harming the host system 210, and/or one or more computing systems connected to the network 104. The virtualized environment 215 may be configured for installing a new application 205' for execution, prior to allowing the new application 205' to operate on the host system 210. In some embodiments, the virtualized environment 215 may be configured to simulate, execute, or otherwise run the new application 205', separate from the normal processes of the host system 210. In some embodiments, the virtualized environment 215 may be configured to run some of the one or more elements 207'A-N and not run the remaining one or more elements 207'A-N. For example, the virtualized environment 215 may execute the application 205' without affecting the rest of the host system 210. In this example, if the application 205' includes one or more malicious elements 207'A-N that may modify protected resources without proper permissions, running the application 205' in the virtualized environment 215 may confine any such harmful effects from affecting the rest of the host system 210.

The virtualized environment program execution restrictor 220 may be configured to determine, or to facilitate determination of a set of policies 225A-N for the new application 205'. In some embodiments, the program execution restrictor 220 may be configured to determine the set of policies 225A-N for each of the one or more elements 207'A-N of the application 205'. The set of policies 225A-N may allow the new application 205' to add, delete, or otherwise modify specific elements 207A-N during (e.g., non-malicious, normal or proper) installation and/or execution of the new application 205' in the virtualized environment 215. In some embodiments, the program execution restrictor 220 may be utilized and/or configured to generate the set of policies 225A-N based on the actions or operations of each of the one or more elements 207'A-N during installation and/or runtime of the application 205'.

In some embodiments, the virtualized environment program execution restrictor 220 may be configured to generate a log record of actions or operations by the new application 205' to add program elements 207'A-N during installation and/or execution of the new application 205' in the virtualized environment 215. The log record of actions or operations by the new application 205' may include data on the actions or operations by the new application 205', such as type of action or operation, the types and/or identities of program elements used or executed by the application, memory consumed and/or accessed (e.g., executable regions or memory regions), and data resources referenced, among others. For example, while executing each of the one or more elements 207'A-N, the virtualized environment program execution restrictor 220 may generate a log of the actions and operations by the one or more elements 207'A-N of the new application 205'.

In some embodiments, the process monitor of the virtualized environment 215 may be configured to or be utilized to detect for malicious behavior by the new application 205' in the virtualized environment 215. In some embodiments, the process monitor of the virtualized environment 215 may be configured to detect, monitor or determine whether the element 207'A-N exhibits malicious behavior based on the properties or characteristics of the actions or operations by the element 207'A-N. For example, if the properties of the actions or operations by the element 207'A-N as recorded in the log record indicates that the element 207'A-N is attempting to change the file system permissions of data files on the computing device 100, the process monitor of the virtualized environment 215 may determine that the element 207'A-N is exhibiting malicious behavior. In some embodiments, the process monitor of the virtualized environment 215 may be configured to identify properties of the actions or operations by the element 207'A-N as being associated with one of a list of malicious operations. The list of malicious operations may include a number of operations predetermined to be malicious, such as accessing a memory address not allocated to the application 205' (e.g., a non-executable region) and/or attempting to access other protected resources, among others.

In some embodiments, the policy generator of the virtualized environment and/or program execution restrictor 220 may be configured to determine a set of policies 225A-N using the generated log record. For example, for each entry (or certain types of entries) of the generated log record, the policy generator may determine what or which policy 225A-N to set or establish based on the actions or operations recorded in the log record. In some embodiments, the policy generator may determine the set of policies 225A-N based on detection of malicious behavior from the new application 205' as determined by the process monitor of the virtualized environment 215. For example, once the policy generator determines that the element 207'A-N is exhibiting malicious behavior based on the log record, the policy generator may set or create a policy 225A-N for the element 207'A-N to not allow this element to be introduced and/or executed on the host system 210. In this example, once the policy generator determines that the element 207'A-N is not exhibiting malicious behavior based on the log record, the policy generator may set or create a policy 225A-N for the element 207'A-N to be allowed to be introduced and/or executed on the host system 210. In some embodiments, responsive to determining that at least one of the one or more elements 207'A-N exhibits malicious behavior, the policy generator may be configured to generate a policy to not allow the application 205' to be executed on the host system 210.

In some embodiments, the program execution restrictor 220 may be configured to generate the set of policies 225A-N based on direct observation of the behavior of the application 205' and/or manual input. For example, a user may manually specify one or more of the policies according to the observation, e.g., via an interface for the program execution restrictor 220. For example, an administrator, or a user of the host system 210, may specify that the application 205' is allowed to be executed at the host system 210 when the new application 205' does not modify any files on the host system 210 or transmit data via the network 104. In this example, the virtualized environment program execution restrictor 220 may specify that the new application 205' is allowed to be executed at the host system 210, if all of the elements 207'A-N of the new application 205' does not exhibit malicious behavior. In some embodiments, the virtualized environment program execution restrictor 220 may be configured to generate the set of policies 225A-N based on manually specified policies (e.g., pre-defined specifications) specifying which policies to set based on the log record of actions or operations of the elements 207'A-N of the program 205A-N. In some embodiments, the virtualized environment program execution restrictor 220 may be configured to generate the set of policies 225A-N based on automatically specified policies (e.g., pre-defined or dynamically-established specifications) specifying which policies to set based on the log record of actions or operations of the elements 207'A-N of the program 205A-N. The specified policies (or specifications) may be, for example, implemented as a function or algorithm specifying which actions or operations of the elements 207'A-N of the program 205A-N are allowed.

In some embodiments, the program execution restrictor 220 may be configured to detect an attempt by the new application 205' to add one of the one or more program elements 207A-N. In some embodiments, the virtualized environment program execution restrictor 220 may be configured to detect the addition of one of the one or more program elements 207A-N based on storage space. For example, while installing the new application 205', the new application 205' may attempt to install one of the one or more elements 207'A-N, causing a change in the amount of storage (e.g., hard drive space) on the host system 210. In this example, the virtualized environment program execution restrictor 220 may detect the attempt by the new application 205' to add the one or more elements 207'A-N by identifying the change in the amount of storage.

In some embodiments, the virtualized environment program execution restrictor 220 may be configured to detect the addition of one of the one or more elements 207A-N based on memory address references. For example, one of the one or more elements 207'A-N may attempt to reference or access a memory address not allocated, allotted or assigned to the application 205'. In this case, the virtualized environment program execution restrictor 220 may detect the attempt by the new application 205' to add the one or more elements 207'A-N to the memory address not allotted to the application 205'. In some embodiments, the virtualized environment program execution restrictor 220 may be configured to detect the addition of one of the one or more elements 207A-N based on detecting a program element (e.g., EXE or DLL) in a process stack or passing through an interface or port of the virtualized environment 215. For example, the virtualized environment program execution restrictor 210 may detect an additional file (e.g., DLL file) corresponding to an element 207'A-N that may pass through the port of the virtualized environment 215. In this example, based on the detection, the virtualized environment program execution restrictor 210 may determine that the passing through of the addition file corresponding to the element 207' A-N is an attempt by the new application 205' to add the new element 207'A-N.

In some embodiments, the virtualized environment program execution restrictor 220 may be configured to determine a policy 225A-N that allow the new application 205' to add the one of the one or more elements 207'A-N when the element 207'A-N is known to be safe or non-malicious. In some embodiments, the virtualized environment program execution restrictor 220 may be configured to determine that the element 207'A-N to be added to the new application 205' is known to be safe based on properties of the actions or operations of the element 207'A-N. For example, the virtualized environment program execution restrictor 220 may be configured to determine that the actions or operations recorded in the log record corresponding to the one of the one or more element 207'A-N are benign. In this example, based on the determination, the virtualized environment program execution restrictor 220 may be configured to set or generate at least one policy 225A-N to allow the new application 205' to add the one of the one or more program elements 207'A-N.

In some embodiments, the virtualized environment program restrictor 220 may be configured to update the set of policies 225A-N based on determining whether the elements 207'A-N of the application 205' exhibit malicious behavior in the virtualized environment 215 or not. In some embodiments, the virtualized environment program restrictor 220 may be configured to update the set of policies 225A-N based on the log record generated while the new application 205' was executed in the virtualized environment 215. In some embodiments, the virtualized environment program restrictor 220 may be configured to update the set of policies 225A-N, responsive to the virtualized environment program restrictor 220 determining whether all or some of the one or more elements 207'A-N is unknown and/or potentially unsafe for the host system 210.

The virtualized environment program execution restrictor 220 may be configured to verify, via the set of policies 225A-N, an absence of malicious behavior from the new application 205' while the new application 205' executes in the virtualized environment 215. The new application 205' may be allowed to be executed on the host system 210, responsive to the verification. For example, while executing each of the one or more elements 207'A-N in the virtualized environment 215, if virtualized environment program execution restrictor 220 has not detected malicious behavior in connection with all of the one or more elements 207'A-N, the virtualized environment program execution restrictor 220 may verify the absence of malicious behavior from the new application 205'. In some embodiments, the virtualized environment program execution restrictor 220 may be configured to verify or check for, via the set of policies 225A-N, an existence of malicious behavior from the new application 205' while the new application 205' executes in the virtualized environment 215. For example, while executing each of the one or more elements 207'A-N in the virtualized environment 215, once the virtualized environment program execution restrictor 220 has detected malicious behavior in any of the one or more elements 207'A-N, the virtualized environment program execution restrictor 220 has verified or confirmed the existence of malicious behavior from the new application 205'.

In some embodiments, the virtualized environment program execution restrictor 220 may be configured to verify, check or confirm the absence of malicious behavior from the new application 205' based on the set of policies 225A-N specified. For example, if any policy of the set of policies 225A-N specifies that at least one of the one or more elements 207'A-N of the new application 205' is not allowed to be executed on the host system 210, the virtualized environment program execution restrictor 220 may check for a presence of any of the specified elements that are not allowed to be executed on the host system 21, and/or verify the existence of malicious behavior from the new application 205'. In some embodiments, the virtualized environment program execution restrictor 220 may be configured to at least partially verify, via the set of policies 225A-N, an absence of malicious behavior from some of the one or more elements 207'A-N of the application 205'.

In some embodiments, the virtualized environment program execution restrictor 220 may be configured to detect, as a part of the verification, whether the new application 205' attempts to add an element 207'A-N that is at least one of unknown or potentially unsafe for the host system 210. For example, while executing each of the one or more elements 207'A-N in the virtualized environment 215, the new application 205' may attempt to add an element 207'A-N. In this example, the virtualized environment program execution restrictor 220 may determine that the added element 207'A-N is potentially unsafe (e.g., is part of a blacklist, or absent from a whitelist) and may in some embodiments verify the existence of malicious behavior in that element 207'A-N.

In some embodiments, the virtualized environment program execution restrictor 220 may be configured to provide the set of policies 225A-N to the host system program execution restrictor 230 responsive to the verification. For example, after completing the verification of application 205', the virtualized environment program execution restrictor 220 may provide the set of policies 225A-N as the set of policies 225'A-N for the host system program execution restrictor 230 to enforce or apply. In some embodiments, the virtualized environment program execution restrictor 220 may be configured to signal the agent 208 that the virtualized environment program execution restrictor 220 has completed the verification. In some embodiments, responsive to the signaling, the agent 208 may be configured to direct the virtualized environment and/or program execution restrictor 220 to provide, transfer, install or communicate the set of policies 225A-N to the host system program execution restrictor 230 and/or request the virtualized environment 215 to move or transition the new application 205' to the host system 210. For example, responsive to the signaling, the agent 208 may make a disk image copy of the new application 205' for the host system 210 to instantiate the disk image copy as the verified application 205". In another example, responsive to the signaling, the agent 208 may virtually migrate the new application 205' from the virtualized environment 215 to the host system 210. In yet another example, responsive to the signaling, the agent 208 may request the host system 210 to newly install the new application 205' onto the host system 210 as the verified application 205". In another example, responsive to the signaling, the agent 208 may copy over the new application 205' to the host system 210 (e.g., copy EXE, DLL and/or configuration files).

The host system program execution restrictor 230 may be configured to apply the set of policies 225'A-N when the verified application 205" executes on the host system 210. In some embodiments, the set of policies 225'A-N of the host system program execution restrictor 230 may be identical to, or may differ from the set of policies 225A-N provided by the virtualized environment program execution restrictor 220. For example, the set of policies 225'A-N of the host system program execution restrictor 230 may include those specified by the user of the host system 210 in addition to the set of policies 225A-N provided by the virtualized environment program execution restrictor 220. In some implementations, host system program execution restrictor 230 may be configured to allow installation of the verified application 205", responsive to the verification by the virtualized environment program execution restrictor 220.

Figure 2B:
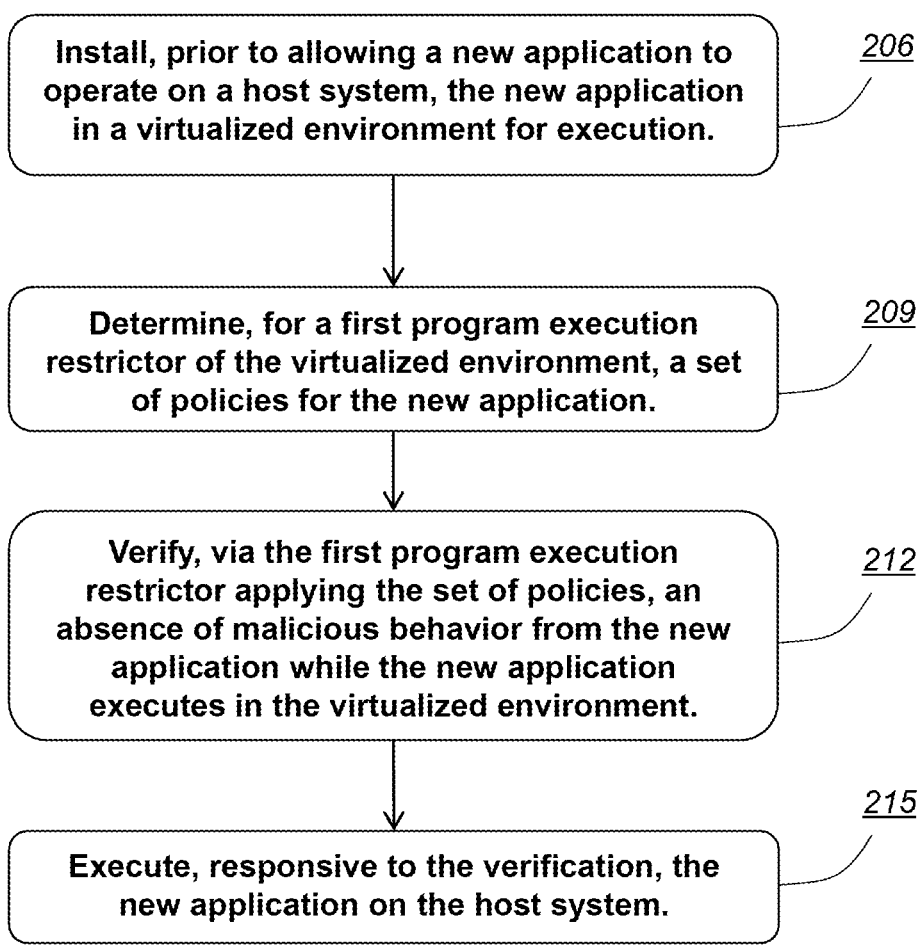
FIG. 2B is an illustrative embodiment of a flow diagram of generating policies for a new application using a virtualized environment prior to executing on a host operating system.

Referring to FIG. 2B, according to an illustrative embodiment, a method 203 for generating policies for a new application using a virtualized environment prior to executing on a host operating system is depicted. The method 203 may include steps or operations 206-212, as shown in FIG. 2B. The method 203 may be performed or be executed by any one or more components of system 200, such as the agent 208, host system 210, virtual environment program execution restrictor 220, and/or host system program restrictor 230. In brief overview, the method 203 may include installing, prior to allowing a new application to operate on a host system, the new application in a virtualized environment for execution (206). The method 203 may include determining, for a first program execution restrictor of the virtualized environment, a set of policies for the new application (209). The method 203 may include verifying, via the first program execution restrictor applying the set of policies, an absence of malicious behavior from the new application while the new application executes in the virtualized environment (212). The method 203 may include executing, responsive to the verification, the new application on the host system (215).

Referring to (206), and in more details, the method 203 may include installing, prior to allowing a new application to operate on a host system, the new application in a virtualized environment for execution. For example, the agent 208 may intercept the request to install a new application 205 and may then signal, instruct or request the virtualized environment 215 to install the new application 205'. The virtualized environment 215 may simulate, execute, or otherwise run the application 205' separate from the normal processes of the host system 210'. In this example, if the new application 205' includes one or more malicious elements 207'A-N that attempt to modify or access protected resources without proper permissions, running the new application 205' first in the virtualized environment 215 may confine any such harmful effects from affecting the rest of the host system 210.

Referring to (209), and in more detail, the method 203 may include determining, for a first program execution restrictor of the virtualized environment, a set of policies for the new application. For example, the virtualized environment program execution restrictor 220 may determine the set of policies 225A-N based on the actions or operations of the one or more elements 207'A-N of the new application 205' while being executed in the virtualized environment 210. The set of policies 225A-N may allow the new application 205' to add, delete, access, modify or otherwise use specific program elements 207' A-N that may be normal or proper during installation and/or execution of the new application 205' in the virtualized environment 215.

In some embodiments, a process monitor of the virtualized environment program execution restrictor 220 may generate a log record of actions or operations of the one or more elements 207'A-N of the new application 205' while being executed in the virtualized environment 210. The process monitor may determine or detect whether the element 207'A-N is exhibiting malicious behavior based on some properties of the actions or operations by the element 207'A-N as recorded in the log record. In some embodiments, a policy generator of the virtualized environment program execution restrictor 220 may in turn generate the set of policies 225A-N based on detection of malicious behavior by the process monitor.

Referring to (212), and in more detail, the method 203 may include verifying, via the first program execution restrictor applying the set of policies, an absence and/presence of malicious behavior from the new application while the new application executes in the virtualized environment. For example, while executing each of the one or more elements 207'A-N in the virtualized environment 215, if the virtualized environment execution restrictor 220 does not detect malicious behavior in any of the one or more elements 207'A-N, then the virtualized environment program execution restrictor 220 may confirm or verify the absence of malicious behavior from the new application 205'. In some embodiments, the virtualized environment program execution restrictor 220 may be configured to verify, check, or confirm the absence of malicious behavior from the new application 205' based on the set of policies 225A-N specified. For example, the program execution restrictor 220 may check if a program element of the application is attempting to access or uses an executable memory region that is allowed.

In some embodiments, if the program execution restrictor 220 determines, based on the policies 225A-N, that none of the one or more elements 207' A-N is to be disallowed, the virtualized environment program restrictor 220 may indicate or confirm the absence of malicious behavior from the new application 205'. In some embodiments, the agent 208 may direct the virtualized environment 215 and/or the program execution restrictor 220 to provide, transfer, install, or communicate the set of policies 225A-N to the host system 210.

Referring to (215), and in more detail, the method may include executing, responsive to the verification, the new application on the host system. For example, the virtualized environment program execution restrictor 220 may be configured to signal the agent 208 that the virtualized environment program execution restrictor 220 has completed the verification of the new application 205'. Responsive to the verification, the agent 208 and/or the virtualized environment may then transition, transfer, copy (e.g., disk image copy of a file corresponding to the application 205'), virtually migrate, install or otherwise move the new application 205' to the host system 210 (e.g., as the verified application 205"). Once present on the host system, the host system 210 may execute the verified application 205" in accordance to the set of policies 225'A-N, the set of policies 225'A-N being applied by the program execution restrictor on the host system while the application 205" executes on the host system 210.

C. Applying Policies for a New Web Application Using a Browser Extension

Some embodiments of the program execution restrictors described above may be applicable to Internet-based applications. Web browsers may enable the execution of applications that are available or accessed from servers via the Internet based on standard protocols. The standard protocols for these web applications may allow the web browsers to locally download such applications onto the computing system and/or execute these applications as program elements (e.g., EXE, DLL) on the computing system. A program execution restrictor may block the installation and/or execution of such downloaded program elements. In some embodiments, by allowing any downloaded application to be executed in a trusted mode of the Web browser, the program execution restrictor may allow the application to run while ensuring that access to any other applications that are not trusted is not permitted.

In some embodiments, the web browser may include a browser extension to filter request queries based on associated URL addresses, and to interface with a program execution restrictor. When the web browser sends a request query for a web application, the browser extension may intercept the request query, and a URL address filter of the browser extension may determine whether a URL address corresponding to the request query is on a list of trusted URL addresses. In some embodiments, a web application refers to one or more program elements (e.g., an agent, plug-in, library component) derived from the web or other network via the web browser, which installs and/or executes on the hosts device of the web browser. A web application may include components that are accessed and/or downloaded from a number of different, distinct web or network locations, via URL addresses for example. In some embodiments, a URL address may refer to an address from which the application is accessed or provided, or an address from which a program element is accessed by the application. In some cases, the URL addresses of the web application may share some common base element of the URL (e.g., hostname), which may be identified by the URL filter. In some embodiments, the URL filter may in addition determine whether a location accessed by the web browser is part of the web application, and may determine whether the location is identified in the list of trusted URL addresses.

If the URL filter determines that the URL address is on the list of trusted URL addresses, the browser extension may signal the program execution restrictor to allow downloading and/or installation of the web application. The browser extension may, in some embodiments, signal the program execution restrictor to run the web application in a new instance of the web browser (e.g., a separate browser window) and may specify that the program execution restrictor allow program elements downloaded as part of the web application to run. The program execution restrictor may also disallow the computing device from running any other web application besides the verified web application or besides the verified web application and verified program elements to run on the web browser or the new instance of the web browser.

In some embodiments, the web browser and/or web application may comprise a new application being requested to be introduced into a host system. Such a new application may be directed to a virtualized environment to be exercised, observed and/or verified as described above in connection with FIGS. 2A and 2B.

Figure 3A:
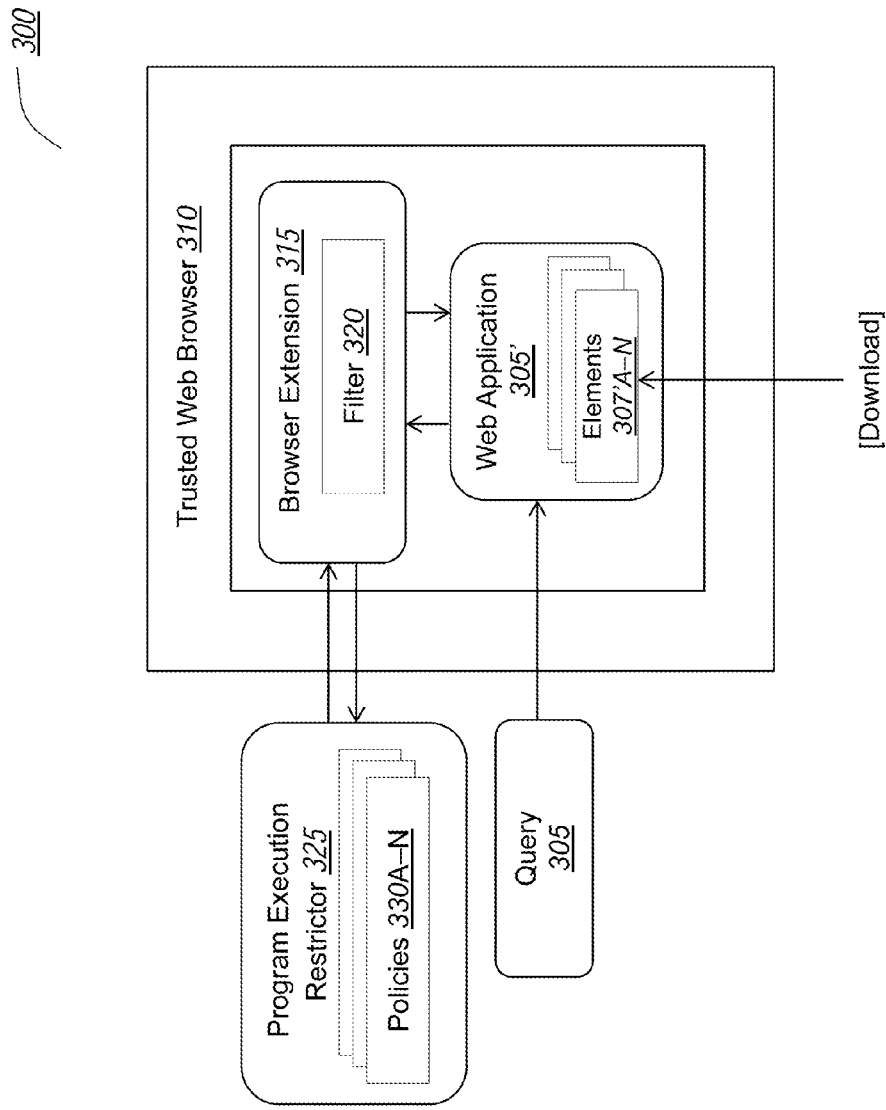
FIG. 3A is a block diagram depicting embodiments of a system for applying policies for a new web application using a browser extension.

Referring to FIG. 3A, an embodiment of system 300 to apply policies for a new web application using a browser extension is depicted. In brief overview, the system 300 may include a query 305, web application 305' a web browser 310, a browser extension 315, and/or a program restrictor 320. Each of these components of system 300 may be controlled by, implemented using, or incorporate features of a computing device, for example as described above in connection with FIGS. 1A-1C. Each component, module, and any sub-module thereof, may include hardware or a combination of hardware and software. For example, a module or submodule may include any application, program, library, script, task, service, process or any type and form of executable instructions executing on any type and form of hardware of the system. In some embodiments, a module or submodule may incorporate one or more processors and/or circuitries configured to perform any of the operations and functions described herein. For example, system 300 and the any of the components therein may run or be executed on one or more processors and memory of a computing system, such as the main processor 121 and main memory 122 of computing device 100.

In some embodiments, the query 305 may comprise a request or instruction for accessing or downloading a web application from one or more external servers 106A-N and may include at least one address (e.g., a URL) that references the web application 305'. In some embodiments, the web application 305' may in turn access or reference one or more addresses corresponding to one or more program elements of the web application.

In some embodiments, a web browser 310 may refer to an application executed on a computing device 100, that can transmit one or more requests for web applications 305' (e.g., via at least one query 305), and to retrieve and present web applications from the web as specified by the query 310. In some embodiments, a web browser may be referred to as a trusted web browser 310, which is trusted or allowed or authorized with a certain level of access to obtain or introduce web applications from the web onto the host device or environment. The web browser 310 may include a browser extension 315 to interface with the program execution restrictor 325. In some embodiments, the browser extension 315 may be modified to include the browser extension 315. In some embodiments, the browser extension 315 may comprise an external code module added or incorporated to the web browser. The browser extension 315 may comprise, for example, a helper object or a browser add-in.

The browser extension 315 may be configured to intercept or receive the query 305 from the web browser 310. The browser extension 315 may be configured to interface with a program execution restrictor 325 to determine whether to allow the execution of a web application 305' associated with the query 305 on the trusted web browser 310. The browser extension 315 may be configured to retrieve a list of trusted or allowed web applications from the program execution restrictor 325. The list of trusted web applications may include one or more addresses (e.g., web addresses) identifying or associated with the web applications that are to be trusted. The addresses may comprise any the form of URL addresses, URL filter specifications, regular expressions, and/or public, private, or proprietary wildcard syntaxes, among others. In some embodiments, the browser extension 315 may be configured to retrieve the list of trusted web applications from an external server 106A-N or an intermediary residing between the external server 106A-N and the computing device on which the trusted web browser 310 is operating on.

In some embodiments, the filter 320 may be configured to check the address of a query 305 with the list of trusted web applications. In some embodiments, the filter 320 may be configured to check one or more addresses previously visited by a trusted web browser 310 with the list of trusted web applications.

Responsive to determining that the address of the query 450 is on the list of trusted web applications, the browser extension 315 may be configured to signal or inform the program execution restrictor 325 that the address is on the list of trusted web applications. The browser extension 315 may be configured to allow the web application 305' to download one or more program elements 307'A-N of the web application. For example, the browser extension 315 may download the one or more web pages corresponding to the one or more elements 307'A-N referenced by the addresses. Responsive to determining that the address of the query is not on the list of trusted web applications, the browser extension 315 may be configured to signal the program execution restrictor 325 to not allow the web application 305' from downloading and/or saving any elements 307'A-N to the host device. In some embodiments, the browser extension 315 may be configured to prevent access to any web locations or servers with addresses not on the list of trusted web applications.

The program execution restrictor 325 may be configured to allow or disallow the downloading, installation, or execution of a web application based on a set of policies 330A-N. The set of policies 330 A-N may be stored in a database or storage associated with the program execution restrictor 325. In some embodiments, the program execution restrictor 325 may be configured to incorporate the features of the program execution restrictors 220 and 230 discussed above in Section B and apply the same or similar techniques to web applications 305'. In some embodiments, the program execution restrictor 325 may be configured to apply the set of policies 330A-N on the new web application 305', while the new application 305' installs and/or executes via the trusted web browser 310. For example, after the filter 320 determines that the address associated with the query 305 is on the list of trusted web applications, and when the browser extension 320 requests download or installation of one of the one or more elements 307'A-N, the program execution restrictor 325 may block or restrict downloading of the one or more elements 307'A-N based on the set of policies 330A-N. In some embodiments, the program execution restrictor 325 may be configured to specify the browser 310 to not block the downloading or saving of one or more elements 307'A-N of the web application 305' based on the set of policies 330A-N.

In some embodiments, the program execution restrictor 325 may be configured to specify the establishment or instantiation of another web browser 310 to execute the web application 305' corresponding to the query 305. For example, once the browser extension 315 has determined that the address of the query 305 is on the list of trusted web applications, the program execution restrictor 325 may initiate a new instance of a web browser 310 to run the web application 305' and to save or download any elements 307'A-N. In some embodiments, the program execution restrictor 320 may be configured to restrict execution of any other web application besides the web application 205' for which the new instance of the web browser 315 was instantiated. Continuing this example, the new instance of the web browser 310 may not be able to run any other web application beside the web application 305' that was determined to be on the list of trusted web applications. In some embodiments, the program execution restrictor 320 may be configured to restrict execution of some other web applications besides the web application 205' based on the set of policies 330A-N. For example, after having allowed web application 205', the program execution restrictor 320 may allow installation of web application "A" but not allow the execution of web application "B" in the same web browser 310 or web browser 310 instance.

Figure 3B:
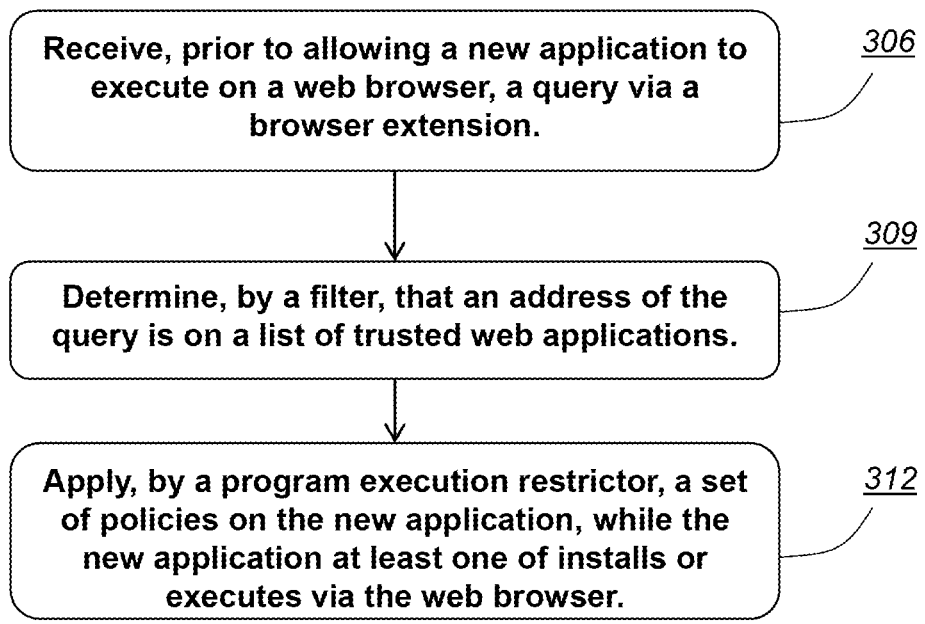
FIG. 3B is an illustrative embodiment of applying policies for a new web application using a browser extension.

Referring to FIG. 3B, and according to an illustrative embodiment, a method 303 for applying policies for a new application using a browser extension is depicted. The method 303 may include steps or operations 306-312, as shown in FIG. 3B. The method 303 may be performed or be executed by any one or more components of system 300, such as the web browser 310, browser extension 315, and program execution restrictor 325. In brief overview, the method 303 may include receiving, prior to allowing a new application to execute on a web browser, a query via a browser extension (306). The method 303 may include determining, by a filter, that an address of the query is on a list of trusted web applications (309). The method 303 may include applying, by a program execution restrictor, a set of policies on the new application, while the new application at least one of installs or executes via the web browser (312).

Referring to (306), and in more detail, the method 303 may include receiving, prior to allowing a new application to execute on a web browser, a query via a browser extension. For example, the browser extension 315 may intercept or receive the query 305 from the trusted web browser 310. The query 305 may comprise a request or instruction for a web application from one or more external servers 106A-N and may include at least one address (e.g., URL) corresponding to the web application 305'. The web application 305' may in turn access or reference one or more program elements via one or more other addresses.

Referring to (309), and in more detail, the method 303 may include determining, by a filter, that an address of the query is on a list of trusted web applications. For example, the browser extension 315 may interface or communicate with the program execution restrictor 325 to retrieve the list of trusted web applications from the program execution restrictor 325. The list of web applications may identify which web applications are to be trusted by the web browser 310. Using the list of trusted web applications, a filter 320 of the browser extension 315 may check or determine whether the address associated with the query 305 matches one of the addresses of a trusted web application.

In some embodiments, the filter 320 may check or determine whether the addresses previously visited by the trusted web browser matches one of the addresses of a trusted web application. If there is a match between the address associated with the query 305 and one of the addresses in the list of trusted web applications, the filter 320 may determine that the address of the query 305 is on the list of trusted web applications and signal the web browser that the web application 305' corresponding to the query 305 is safe or trusted for downloading.

Referring to (312), and in more detail, the method 303 may include applying, by a program execution restrictor, a set of policies on the new application, while the new application at least one of installs or executes via the web browser om the host device. The set of policies may specify that the web browser 310 is to only access, install and/or execute the one or more elements 307'A-N of the web application 305'. For example, once the filter 320 determines that the address associated with the query 305 matches one of the addresses on the list of trusted web applications, the browser extension 315 may signal the web browser 310 to allow the web application 305' to download one or more elements 307'A-N referenced by the addresses of the web application 305'. While executing the one or more elements 307'A-N, the set of policies may specify that the web browser 310 is not to execute any other element or web application besides the one or more elements 307'A-N and the web application 305'.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method for generating policies for a new application using a virtualized environment prior to executing on a host operating system of a client device, the method comprising:
    installing, responsive to a request to install a new application on a host system and prior to allowing the new application to operate on the host system, the new application in a virtualized environment for execution;
    determining, for a first program execution restrictor of the virtualized environment, a set of policies for the new application, the set of policies allowing the new application to add specific program elements during execution of the new application in the virtualized environment;
    detecting, by the first program execution restrictor, that the specific program elements are added to the new application during execution of the new application in the virtualized environment;
    verifying, via the first program execution restrictor applying the set of policies, an absence of malicious behavior from the specific program elements detected to be added to the new application during execution of the new application in the virtualized environment, wherein malicious behavior includes accessing a memory address restricted from the new application; and
    executing, responsive to the verification, the new application on the host system, the host system having a second program execution restrictor that applies the set of policies when the new application executes on the host system.

2. The method of claim 1, further comprising intercepting, by an agent executing on the host system, the request to install the new application on the host system.

3. The method of claim 1, further comprising directing, by an agent executing on the host system, the new application to the virtualized environment for installation responsive to the request to install the new application on the host system.

4. The method of claim 1, further comprising using a process monitor of the virtualized environment to detect for malicious behavior by the new application in the virtualized environment.

5. The method of claim 1, further comprising generating, by the first program execution restrictor, a log record of actions by the new application to add program elements during installation and execution of the new application.

6. The method of claim 5, further comprising determining, by a policy generator, the set of policies using the generated log record.

7. The method of claim 1, wherein determining the set of policies comprises detecting an attempt by the new application to add a first program element, and generating a first policy that allows the new application to add the first program element if the first program element is known to be safe.

8. The method of claim 1, wherein the verifying comprises detecting if the new application attempts to add a program element that is at least one of unknown or potentially unsafe for the host system.

9. The method of claim 1, further comprising providing, by the virtualization environment, the set of policies to the second program execution restrictor of the host system responsive to the verification.

10. The method of claim 1, further comprising requesting, by an agent executing on the host system, the virtualization environment to transition the new application to the host system after verifying the absence of malicious behavior.

11. A system for generating policies for a new application using a virtualized environment prior to executing on a host operating system of a client device, the system comprising:
    a virtualized environment executed on a computing device having one or more processors, configured to install a new application in the virtualized environment for execution, responsive to a request to install the new application on a host system and prior to allowing the new application to operate on the host system;
    a first program execution restrictor executing in the virtualized environment, the first program execution restrictor configured to:
        determine a set of policies for the new application, the set of policies allowing the new application to add specific program elements during execution of the new application in the virtualized environment;
        detect that the specific program elements are added to the new application during execution of the new application in the virtualized environment; and
        verify, via the set of policies, an absence of malicious behavior from the specific program elements detected to be added to the new application during execution of the new application in the virtualized environment, wherein malicious behavior includes accessing a memory address restricted from the new application, wherein the new application is allowed to execute on the host system responsive to the verification; and
    a second program execution restrictor executing on the host system, the second program execution restrictor configured to apply the set of policies when the new application executes on the host system.

12. The system of claim 11, further comprising an agent executing on the host system, the agent configured to intercept the request to install the new application on the host system.

13. The system of claim 11, further comprising an agent executing on the host system, the agent configured to direct the new application to the virtualized environment for installation responsive to the request to install the new application on the host system.

14. The system of claim 11, further comprising a process monitor of the virtualized environment, the process monitor utilized to detect for malicious behavior by the new application in the virtualized environment.

15. The system of claim 11, wherein the first program execution restrictor is configured to generate a log record of actions by the new application to add program elements during installation execution of the new application.

16. The system of claim 15, further comprising a policy generator configured to determine, using the generated log record, the set of policies.

17. The system of claim 11, wherein the first program execution restrictor is configured to detect an attempt by the new application to add a first program element, and to determine a first policy that allows the new application to add the first program element if the first program element is known to be safe.

18. The system of claim 11, wherein the first program execution restrictor is configured to detect, as part of the verification, if the new application attempts to add a program element that is at least one of unknown or potentially unsafe for the host system.

19. The system of claim 11, wherein the virtualization environment is configured to provide the set of policies to the second program execution restrictor of the host system responsive to the verification.

20. The system of claim 11, further comprising an agent executing on the host system, the agent configured to request the virtualization environment to transition the new application to the host system after verifying the absence of malicious behavior.

\* \* \* \* \*